United States Patent
Min et al.

(10) Patent No.: US 9,589,186 B2
(45) Date of Patent: Mar. 7, 2017

(54) IRIS RECOGNITION APPARATUS AND OPERATING METHOD THEREOF

(71) Applicant: IRIS ID, INC., Seoul (KR)

(72) Inventors: Seung Gi Min, Seoul (KR); Kie Young Lee, Seoul (KR)

(73) Assignee: IRIS ID, INC., Seoul (KR)

( * ) Notice: Subject to any disclaimer, the term of this patent is extended or adjusted under 35 U.S.C. 154(b) by 0 days.

(21) Appl. No.: 14/730,048

(22) Filed: Jun. 3, 2015

(65) Prior Publication Data

US 2015/0347844 A1 Dec. 3, 2015

(30) Foreign Application Priority Data

Jun. 3, 2014 (KR) .................. 10-2014-0067932
Jun. 3, 2014 (KR) .................. 10-2014-0067938

(51) Int. Cl.
*G06K 9/00* (2006.01)

(52) U.S. Cl.
CPC ....... *G06K 9/00604* (2013.01); *G06K 9/0061* (2013.01); *G06K 9/00912* (2013.01)

(58) Field of Classification Search
None
See application file for complete search history.

(56) References Cited

U.S. PATENT DOCUMENTS

| | | | | |
|---|---|---|---|---|
| 2002/0033896 A1* | 3/2002 | Hatano | .............. | G06K 9/00597 348/333.03 |
| 2002/0131622 A1 | 9/2002 | Lee et al. | | |
| 2002/0191075 A1* | 12/2002 | Doi | .................... | G06K 9/00604 348/78 |
| 2003/0118217 A1* | 6/2003 | Kondo | ............... | G06K 9/00604 382/117 |
| 2003/0219247 A1* | 11/2003 | Doi | ......................... | A61B 3/14 396/429 |
| 2006/0056046 A1* | 3/2006 | Saori | .................... | G02B 13/009 359/680 |
| 2006/0192868 A1 | 8/2006 | Wakamori | | |
| 2011/0227741 A1* | 9/2011 | Jeon | ...................... | B60R 25/102 340/573.1 |
| 2012/0293629 A1 | 11/2012 | Min et al. | | |
| 2013/0033593 A1* | 2/2013 | Chinnock | ............... | A61B 3/14 348/78 |
| 2013/0089240 A1 | 4/2013 | Northcott et al. | | |

OTHER PUBLICATIONS

European Search Report for Application No. 15170285.9 dated Oct. 8, 2015; 8 pages.

* cited by examiner

*Primary Examiner* — Jason Heidemann
*Assistant Examiner* — Brian Shin
(74) *Attorney, Agent, or Firm* — Loza & Loza, LLP; Heidi L. Eisenhut

(57) ABSTRACT

An iris recognition apparatus for recognizing iris in an eyeball is provided. In particular, an iris recognition apparatus including a reflection unit that reflects and transmits an image of an eyeball is provided. The reflection unit reflects and transmits an image of an eyeball. A first image collection unit collects a reflected image. A control unit extracts an iris pattern based on the collected image.

18 Claims, 6 Drawing Sheets

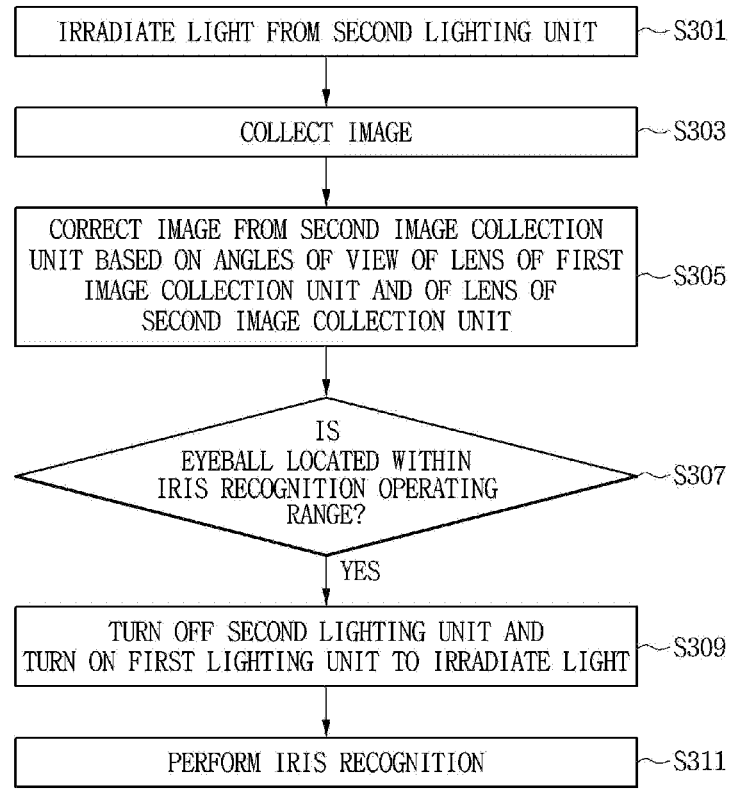
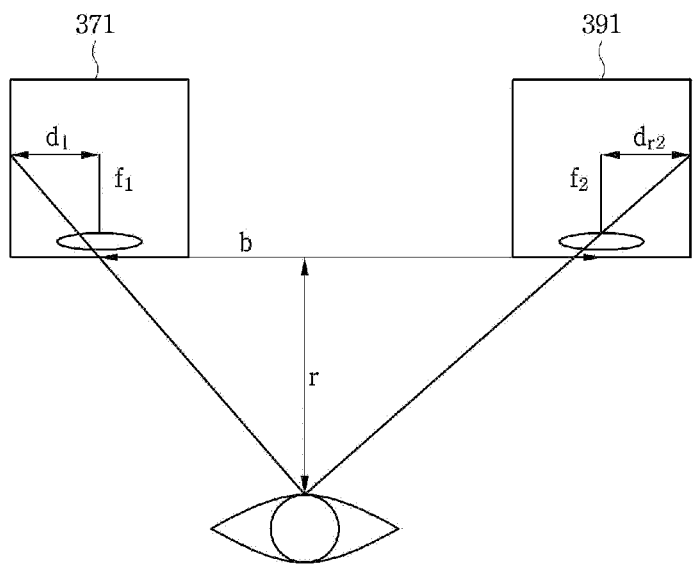

FIG. 9
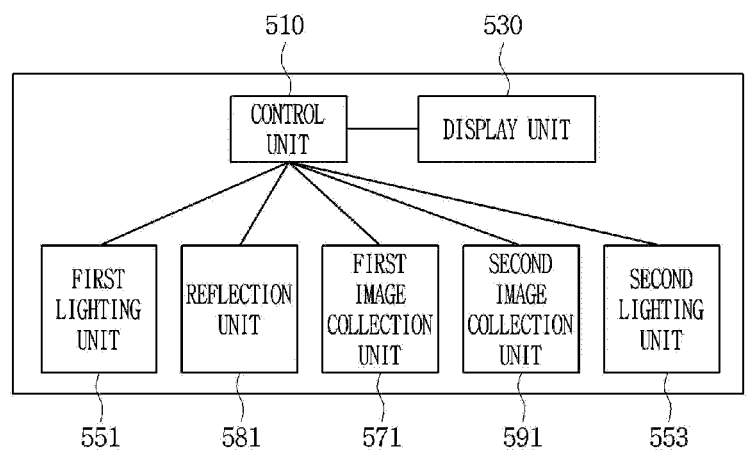
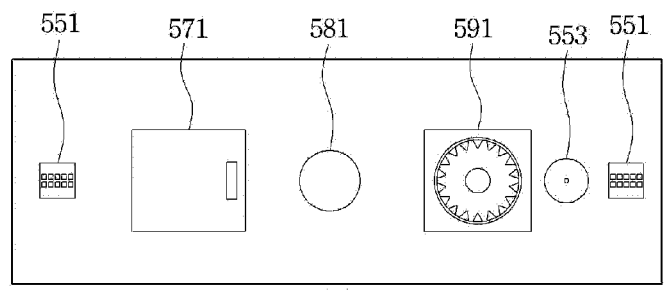
FIG. 10(a)
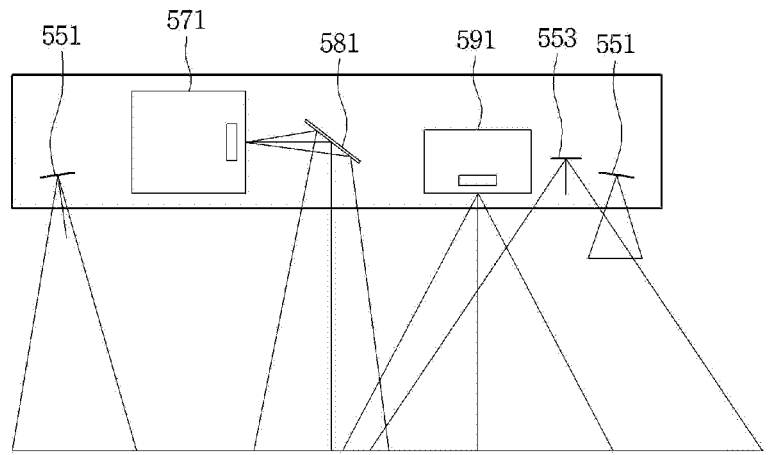
FIG. 10(b)

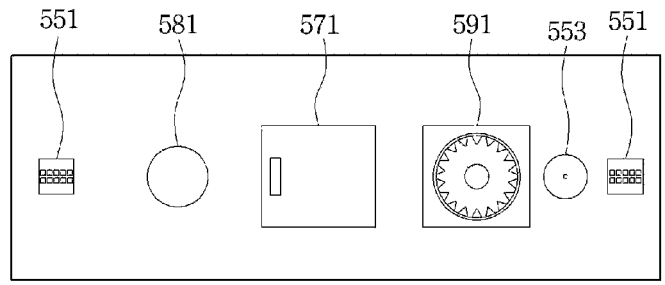
FIG. 11(a)
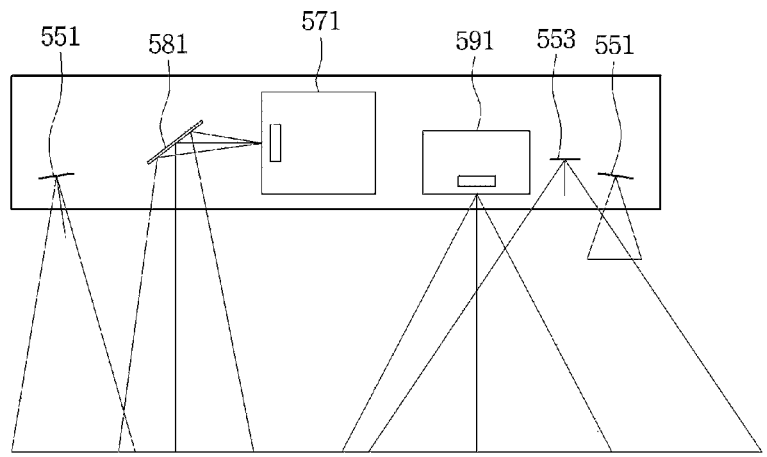
FIG. 11(b)
FIG. 12
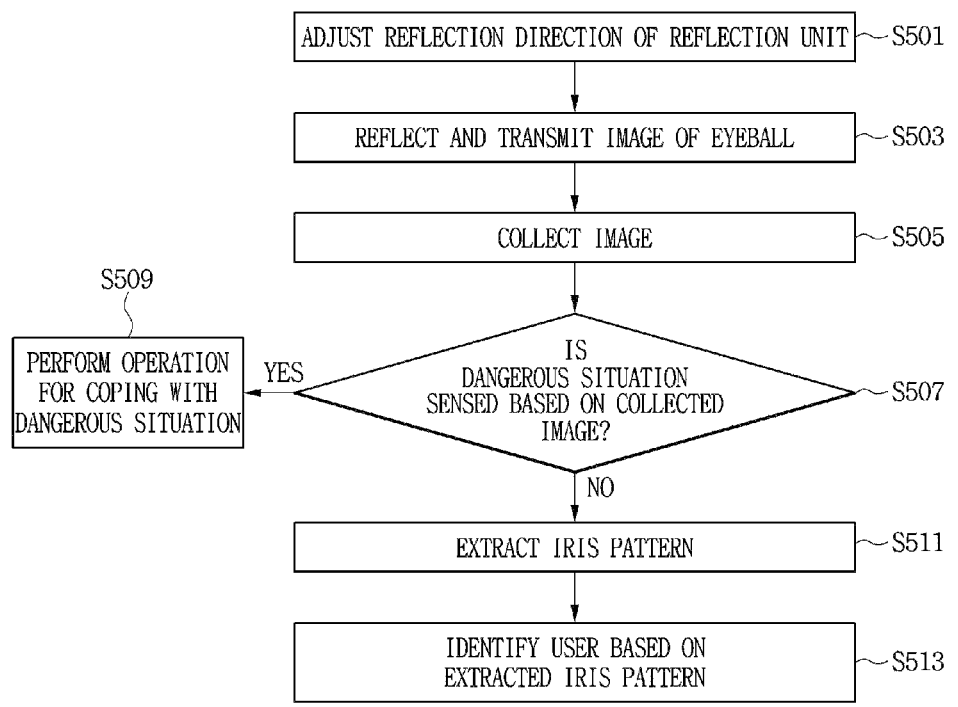

IRIS RECOGNITION APPARATUS AND OPERATING METHOD THEREOF

CROSS-REFERENCE TO RELATED APPLICATIONS

The present application claims priority under 35 U.S.C. 119 and 35 U.S.C. 365 to Korean Patent Applications No. 10-2014-0067932 filed on Jun. 3, 2014 and No. 10-2014-0067938 filed on Jun. 3, 2014, which is hereby incorporated by reference in its entirety.

BACKGROUND

The present disclosure relates to an iris recognition apparatus and an operating method thereof, and more particularly, to an iris recognition apparatus using a plurality of image collection units, and an operating method thereof.

Electronic products such as computers or cellular phones include user's personal information in many cases. Also, the proliferation of electronic commerce using electronic products such as computers and cellular phones is a modern trend. Thus, the electronic products need to accurately identify users. To this end, a method of recognizing users by using passwords and IDs has been widely used. However, such a method has limitations in personal information protection and anti-hacking. Thus, many alternatives to replace it have been proposed.

Among others, a biometric system is being gradually commercialized. The biometrics refers to extracting bio information of individuals which is different from one person to another, and determining the individuals. In particular, a cellular phone including a fingerprint recognition device is being widely used through commercialization. However, an opinion that it is not difficult to copy fingerprint and thus there is still the risk of hacking is being presented. Thus, an iris recognition apparatus has received attention as a method of solving such a limitation.

The iris recognition apparatus is an apparatus that recognizes the iris of a person to identify the identity of the person. Such an iris recognition system has an advantage in that it is difficult to copy or forge iris unlike fingerprint. In order to perform iris recognition by using the iris recognition apparatus, the eyeball of a user for iris recognition should be located within an iris recognition operating range of the iris recognition apparatus.

Thus, the iris recognition apparatus may include a distance measuring device in order to determine whether the iris of a user is located with the iris recognition operating range. In this case, the distance measuring device may use a distance sensor that uses ultrasonic waves or laser beams. In this case, a distance to the eyeball means the distance from a part from which ultrasonic waves or laser beams are emitted to the eyeball of an information provider.

Since such a distance sensor needs an additional device, it may disturb the miniaturization of the iris recognition apparatus. Also, since such a distance sensor needs to be additionally installed at the iris recognition apparatus, it leads to an increase in production cost.

In general, an angle of view of an image collection unit used for iris recognition is relatively narrower than that of a camera used for picture capturing. Thus, the range of an image that the image collection unit may collect is relatively narrower than that of a camera used for picture capturing or the like Therefore, when iris is recognized, the eyeball needs to be located within a correct range. Thus, the iris recognition apparatus may cause inconvenience in that a user should correctly locate his or her eyeball to be within the iris recognition operating range that is narrow.

SUMMARY

Embodiments provide an iris recognition apparatus measuring a distance by using a plurality of image collection units, and an operating method thereof.

Embodiments also provide an iris recognition apparatus including a reflection unit reflecting an image of the eyeball, and an operating method thereof.

Embodiments also provide an iris recognition apparatus minimizing the thickness despite having a reflection unit and an image collection unit, and an operating method thereof.

In one embodiment, an iris recognition apparatus for recognizing iris in an eyeball includes: a first image collection unit collecting a first image of the eyeball; a second image collection unit including a lens having a larger angle of view than a lens of the first image collection unit and collecting a second mage of the eyeball; and a control unit correcting the first image based on a ratio between the angle of view of the lens of the first image collection unit and the angle of view of the lens of the second image collection unit, and measuring the distance between the eyeball and the iris recognition apparatus based on the first image corrected and the second image.

The control unit may sample the first image with a value obtained by dividing the angle of view of the lens of the first image collection unit by the angle of view of the lens of the second image collection unit.

The iris recognition apparatus may further include: a first lighting unit irradiating visible light; and a second lighting unit irradiating an infrared ray, wherein the control unit selectively turns on the first lighting unit or the second lighting unit based on an iris recognition operating range within which iris recognition is performed on the eyeball.

In another embodiment, an operating method of an iris recognition apparatus for recognizing iris in an eyeball includes collecting a first image of the eyeball through a first image collection unit; collecting a second mage of the eyeball through a second image collection unit including a lens having a larger angle of view than a lens of the first image collection unit; correcting the first image based on a ratio between the angle of view of the lens of the first image collection unit and the angle of view of the lens of the second image collection unit; and measuring the distance between the eyeball and the iris recognition apparatus based on the first image corrected and the second image.

The sampling of the first image may include sampling the first image with a value obtained by dividing the angle of view of the lens of the first image collection unit by the angle of view of the lens of the second image collection unit.

The operating method may further include selectively irradiating visible light and an infrared ray based on an iris recognition operating range within which iris recognition is performed on the eyeball.

In another embodiment, an iris recognition apparatus for recognizing iris in an eyeball includes a reflection unit reflecting and transmitting a first image of the eyeball; a first image collection unit collecting the first image reflected; and a control unit extracting an iris pattern based on the first image collected.

The iris recognition apparatus according may further include a plate-shaped frame, wherein the reflection unit is installed at the frame and reflects the first image entering a surface of the frame and the first image collection unit is installed in the frame and collects the first image reflected from the reflection unit.

The iris recognition apparatus may further include a second image collection unit collecting a second image of the eyeball entering the surface of the frame, wherein the reflection unit reflects the first image to the second image collection unit.

The control unit may sense a dangerous situation based on at least one of the location of the eyeball, an iris pattern and the operation of the eyeball, and perform an operation for coping with the dangerous situation when the dangerous situation is sensed.

The details of one or more embodiments are set forth in the accompanying drawings and the description below. Other features will be apparent from the description and drawings, and from the claims.

BRIEF DESCRIPTION OF THE DRAWINGS

FIG. 7 is a flowchart of an operation of an iris recognition apparatus according to another embodiment.

FIG. 8 depicts the distance measurement of an iris recognition apparatus according to another embodiment.

FIG. 9 shows a block diagram of an iris recognition apparatus according to still another embodiment.

FIGS. 10a and 10b show an iris recognition apparatus including a reflection unit according to still another embodiment.

FIGS. 11a and 11b show an iris recognition apparatus including a reflection unit according to still another embodiment.

FIG. 12 is a flowchart of operations of performing iris recognition according to still another embodiment.

DETAILED DESCRIPTION OF THE EMBODIMENTS

Figure 1:
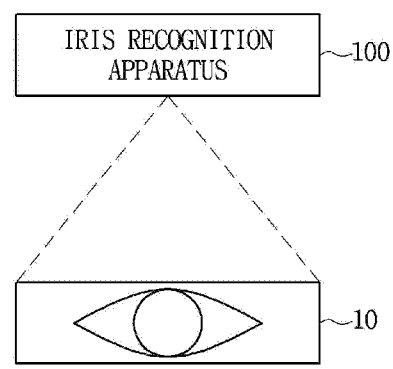
FIG. 1 depicts the iris recognition operating range of an iris recognition apparatus according to an embodiment.

Embodiments are described below in detail with reference to the accompanying drawings so that a person skilled in the art may easily practice the embodiments. However, the present disclosure may be implemented in many different forms and is not limited to embodiments that are described herein. In addition, parts irrelevant to descriptions are not provided in the drawings in order to make the present disclosure clear and similar parts throughout the disclosure have similar reference numerals.

Also, when it is described that a part includes an element, it should be understood that it may not exclude but further include other elements if there is no specific description contrary thereto.

FIG. 1 depicts the iris recognition operating range of an iris recognition apparatus (hereinafter, referred to as an "iris recognition apparatus") according to an embodiment.

A lens necessary for image collection used for iris recognition has a relatively narrow angle of view. This is because there is a need to intensively collect an image within a relatively narrow range in order to discern an iris pattern identifying individuals. Thus, an iris recognition apparatus 100 has an iris recognition operating range 10 that is a certain range within which it is possible to recognize iris according to an element such as an angle of view of the lens, as shown in FIG. 1. Therefore, the iris recognition apparatus 100 needs to perform iris recognition when the iris of a user is located within the iris recognition operating range. To this end, there is a need to determine the distance between the eyeball of the user and the iris recognition apparatus. However, as described in the BACKGROUND earlier, there may be problems with production cost when the distance sensor is used. As an alternative thereto, it is possible to measure a distance by using a plurality of image collection devices. In particular, measuring the distance by using the plurality of image collection devices has an advantage in that it is possible to use the image collection device for iris recognition that the iris recognition apparatus includes. Related descriptions are provided with reference FIGS. 2 to 7.

Through FIGS. 2 to 5, measuring the distance by using a plurality of image display devices according to an embodiment is described.

Figure 2:
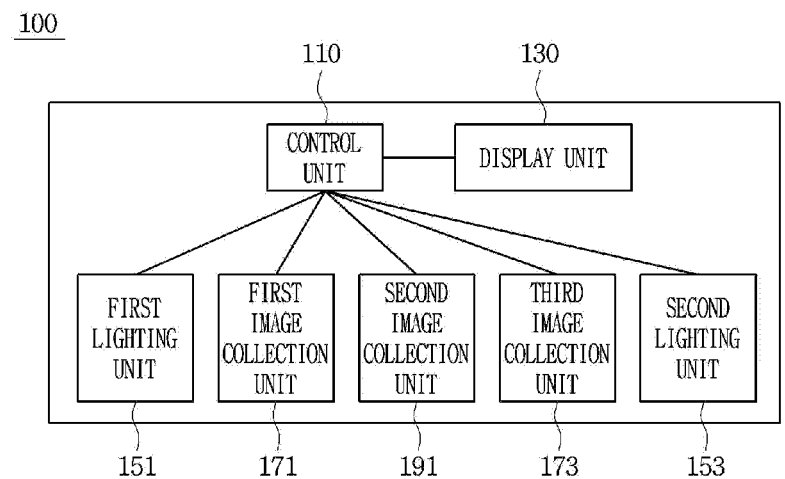
FIG. 2 shows a block diagram of an iris recognition apparatus according to an embodiment.

FIG. 2 shows a block diagram of an iris recognition apparatus according to an embodiment.

As shown in FIG. 2, an iris recognition apparatus 100 according to an embodiment includes a first lighting unit 151, a second lighting unit 153, a first image collection unit 171, a second image collection unit 191, a third image collection unit 173, a control unit 110, and a display unit 130.

The first lighting unit 151 and the second lighting unit 153 irradiate infrared rays to an eyeball including iris for iris recognition. In this case, the infrared ray may be a near infrared ray (NIR) between 700 nm and 900 nm in frequency. In particular embodiments, the iris recognition apparatus 100 may include only any one of the first lighting unit 171 and the second lighting unit 173.

The first image collection unit 171 and the third image collection unit 173 collect images of an eyeball lit by the first lighting unit 151 and the second lighting unit 153. Images collected by the first image collection unit 171 and the third image collection unit 173 are used for iris recognition. Thus, the first image collection unit 171 and the third image collection unit 173 should collect a high-quality image having a narrow range for iris recognition. Therefore, the first image collection unit 171 and the third image collection unit 173 include lenses having relatively small angles of view. In this case, the first image collection unit 171 and the third image collection unit 173 may be cameras in a particular embodiment. In another particular embodiment, the first image collection unit 171 and the third image collection unit 173 may be an image sensor or other devices that may collect images of an eyeball, in addition to the camera.

The second image collection unit 191 collects an image including an eyeball of a user as an image having a relatively wider range than the first image collection unit 171 and the third image collection unit 173. In particular, an angle of view of a lens of the second image collection unit 191 may be larger than those of the first image collection unit 171 and the third image collection unit 173. Related descriptions are provided in detail with reference to FIG. 3.

Figure 3:
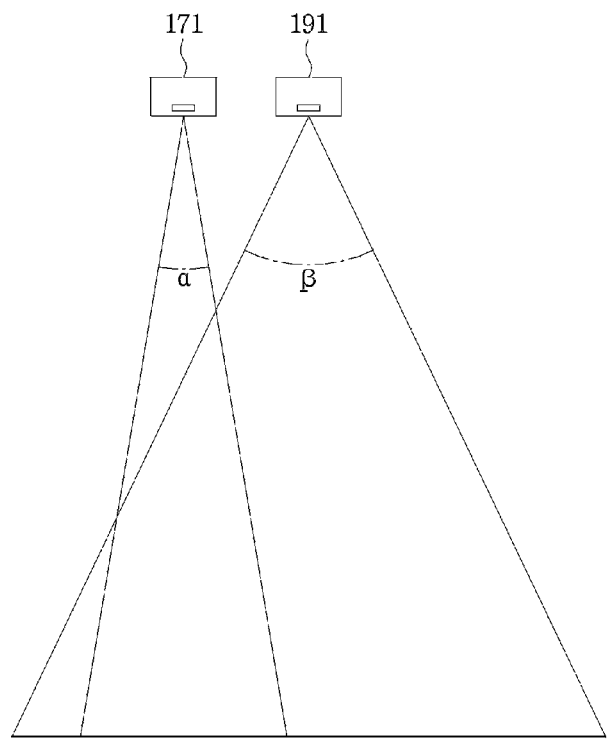
FIG. 3 shows the image collection range of an image collection unit of an iris recognition apparatus according to an embodiment.

FIG. 3 shows the image collection range of an image collection unit of an iris recognition apparatus according to an embodiment.

In FIG. 3, an angle of view of a lens of a second image collection unit 191 is β. An angle of view of the first image collection unit 171 is α. In this case, β is larger than α. In this case, the second image collection unit 191 collects an image having a range corresponding to the angle of β and a first image collection unit 171 collects an image having a range corresponding to the angle of α. Thus, the second image collection unit 191 collects an image having a range wider than the first image collection unit 171. Refer back to FIG. 2 for descriptions.

Thus, an image having a relatively wide range collected by the second image collection unit 191 is used for enabling an eyeball of a user to be located within an iris recognition operating range. In this case, the second image collection unit 191 may be a camera in a particular embodiment. In another particular embodiment, the second image collection unit 191 may be an image sensor or other devices that may collect images of an eyeball, in addition to the camera.

The display unit 130 displays an image collected by the second image collection unit 191. In particular, the display unit 130 may display the iris recognition operating range on the image collected by the second image collection unit 191 to guide the movement of an eyeball of a user. According to an embodiment, it may display an image collected by the first image collection unit 171 or the third image collection unit 173. In a particular embodiment, it is possible to display both the image collected by the second image collection unit 191 and the image collected by the first image collection unit 171 or the third image collection unit 173.

The control unit 110 controls the operations of the display unit 130, the first lighting unit 151, the second lighting unit 153, the first image collection unit 171, the third image collection unit 173, and the second image collection unit 191. Also, the control unit 110 measures a distance to an eyeball for iris recognition based on the images collected by the first image collection unit 171 and the third image collection unit 173. Related descriptions are provided in detail with reference FIGS. 4 to 5. Also, the control unit 110 performs iris recognition based on the image collected by the first image collection unit 171 or the third image collection unit 173. In particular, the control unit 110 may extract an iris pattern from the image collected by the first image collection unit 171 or the third image collection unit 173. Also, the control unit 110 may compare an extracted iris pattern with an iris pattern stored in a storage unit (not shown) to identify a user. In a particular embodiment, the control unit 110 may represent whether an eyeball is located within an iris recognition operating range and the direction in which the eyeball moves to be located within the iris recognition operation range, with sound or a graphic user interface displayed on the display unit 130. The particular operation of the iris recognition apparatus 100 according to an embodiment is described through FIG. 4.

Figure 4:
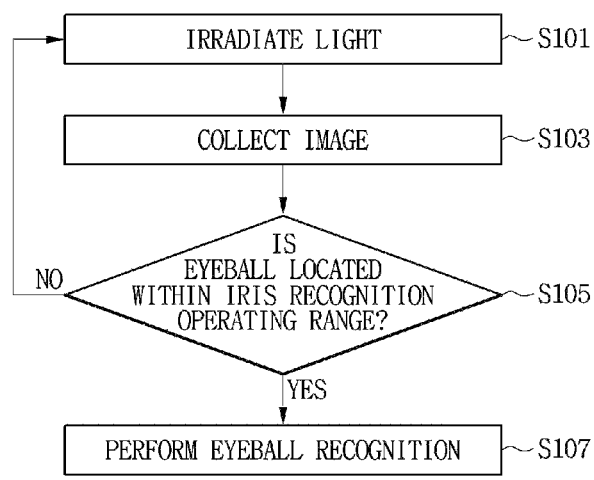
FIG. 4 is a flowchart of an operation of an iris recognition apparatus according to an embodiment.

FIG. 4 is a flowchart of an operation of an iris recognition apparatus according to an embodiment.

The first lighting unit 151 and the second lighting unit 153 irradiate light to an eyeball in step S101.

The first image collection unit 171 and the third image collection unit 173 collect images of a lit eyeball in step S103.

The control unit 110 determines based on the images collected by the first image collection unit 171 and the third image collection unit 173 whether an eyeball of a user for iris recognition is located within an iris recognition operating range, in step S105. In particular, the control unit 110 may measure a distance to the eyeball of the user for iris recognition based on the images collected by the first image collection unit 171, and determine based on the measured distance whether the eyeball is located within the iris recognition operating range. Related descriptions are provided with reference to FIG. 5.

Figure 5:
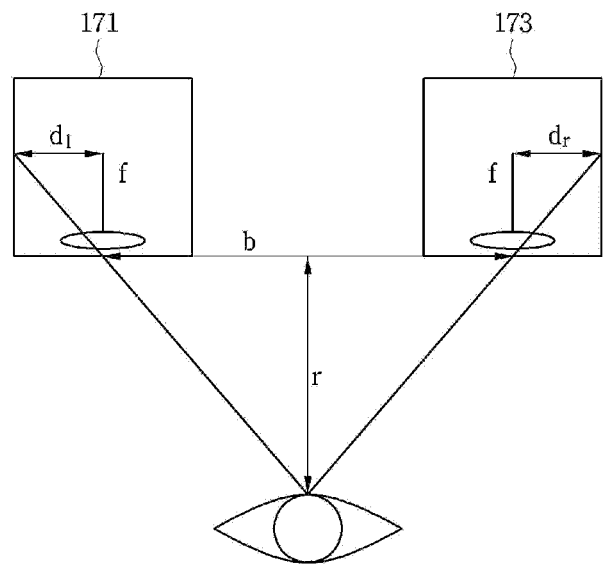
FIG. 5 depicts the distance measurement of an iris recognition apparatus according to an embodiment.
Figure 6:
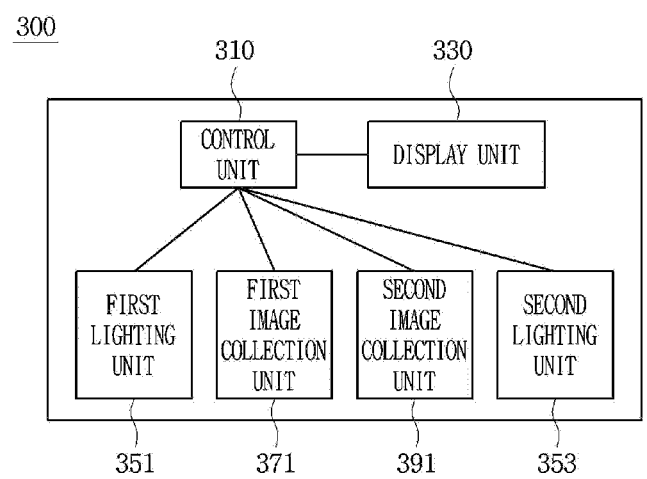
FIG. 6 shows a block diagram of an iris recognition apparatus according to another embodiment.

FIG. 5 depicts the distance measurement of an iris recognition apparatus according to an embodiment.

The control unit 110 may measure the distance r between the iris recognition apparatus 100 and an eyeball based on the distances $d_l$ and $d_r$ of images collected by the first image collection unit 171 and the third image collection unit 173. This is because the control unit 110 changes the distances $d_l$ and $d_r$ of images collected by the first image collection unit 171 and the third image collection unit 173 according to a distance to the eyeball. In this case, the control unit 110 may measure the distance r between the iris recognition apparatus 100 and the eyeball based on the distances $d_l$ and $d_r$ of eyeballs in images collected by the first image collection unit 171 and the third image collection unit 173, the focal length f of lens, and a base line distance b between the first image collection unit 171 and the third image collection unit 173 for correct measurement. This is because the ratio between the distances $d_l$ and $d_r$ of eyeballs in images collected by the first image collection unit 171 and the third image collection unit 173 and the focal length f of lens is the same as that between the base line distance b between the first image collection unit 171 and the third image collection unit 173 and the distance r between the iris recognition apparatus 100 and the eyeball. As a result, the control unit 110 may measure the distance between the iris recognition apparatus 100 and the eyeball by using the following expression in a particular embodiment:

$$r = f \times (b/d).$$

In this case, d in the expression above denotes a sum of the distance $d_l$ of the eyeball in the image collected by the first image collection unit 171 and the distance $d_r$ of the eyeball in the image collected by the third image collection unit 173. However, the expression is rough and a correction process may be added later for precise distance measurement. Refer back to FIG. 4 for descriptions.

If an eyeball of a user for iris recognition is located within an iris recognition operating range, the control unit 110 performs iris recognition in step S107. In particular, the control unit 110 may extract an iris pattern from the image collected by the first image collection unit 171 or the third image collection unit 173. Also, the control unit 110 may compare an extracted iris pattern with an iris pattern stored in a storage unit (not shown) to identify a user. In this case, when the extracted iris pattern matches the stored iris pattern to a certain degree, the control unit 110 may determine that a user having the extracted iris pattern is the same as the user having the stored iris pattern.

Also, if the eyeball of the user for iris recognition is not located within the iris recognition operating range in a particular embodiment, the control unit 110 may represent whether the eyeball is located within the iris recognition operating range and the direction in which the eyeball moves to be located within the iris recognition operation range, with sound or a graphic user interface displayed on the display unit 130. In particular, the display unit 130 may display the iris recognition operating range on the image collected by the second image collection unit 191 to guide the movement of the eyeball of the user. In particular, the display unit 130 may display, on the image collected by the second image collection unit 191, both the iris recognition operating range and the direction in which the eyeball of the user moves, to guide the movement of the eyeball of the user.

Embodiments in FIGS. 2 to 5 need to include a plurality of image collection units having the same focal length, i.e., the same angle of view in order to measure the distance between the eyeball and the iris recognition apparatus 100. In this case, the iris recognition apparatus 100 also uses the second image collection unit 191 having a wider angle of view than an image display device used for iris recognition in order to transmit the iris recognition operating range to the user. Thus, the third image collection unit 173 is not needed if it is possible to use the second image collection unit 191 instead of the third image collection unit 173. In particular, since an electronic product such as a cellular phone or computer in which the iris recognition apparatus 100 is used includes a camera having a relatively wide angle of view for picture capturing and video call, it is possible to use such a camera as the second image collection unit 191. Accordingly, it is possible to reduce the production cost of the iris recognition apparatus 100. Also, it is possible to miniaturize the iris recognition apparatus 100. To this end, a method is needed which may measure the distance between an eyeball and the iris recognition apparatus by using a plurality of image collection units having unequal focal lengths, i.e., unequal angles of view. Related descriptions are provided with reference FIGS. 6 to 8.

FIG. 7 shows a block diagram of an iris recognition apparatus according to another embodiment.

As shown in FIG. 7, an iris recognition apparatus 300 according to an embodiment includes a first lighting unit 351, a second lighting unit 353, a first image collection unit 371, a second image collection unit 391, a control unit 310, and a display unit 330.

The first lighting unit 351 radiates an infrared ray to an eyeball including iris for iris recognition. In this case, the infrared ray may be an NIR between 700 nm and 900 nm in frequency.

The second lighting unit 353 irradiates visible light to the eyeball. In this case, the visible light may be white visible light. The second lighting unit 353 may play a role in brightening the dark at night. In particular, the second lighting unit 353 may be a flash used for a cellular-phone camera. In this case, the control unit 310 may selectively irradiate by using the first lighting unit 351 and the second lighting unit 353 according to the location of an eyeball. Accordingly, the iris recognition apparatus 300 may selectively irradiate an infrared ray and visible light to the eyeball. The particular operations of the iris recognition apparatus 300 is described through FIG. 7.

The first image collection unit 371 collects an image of an eyeball lit by the first lighting unit 351. The image collected by the first image collection unit 371 is used for iris recognition. Thus, the first image collection unit 371 should collect a high-quality image having a narrow range for iris recognition as described earlier. Therefore, the first image collection unit 371 includes a lens having a relatively small angle of view. In this case, the first image collection unit 371 may be a camera in a particular embodiment, as mentioned earlier. Also, the first image collection unit 371 may be an image sensor or other devices that may collect images of an eyeball, in addition to the camera.

The second image collection unit 391 collects an image including an eyeball of a user as an image having a relatively wider range than the first image collection unit 371. An image having a relatively wide range collected by the second image collection unit 391 is used for enabling an eyeball of a user to be located within an iris recognition operating range. In this case, the second image collection unit 391 may be a camera in a particular embodiment. In another particular embodiment, the second image collection unit 391 may be an image sensor or other devices that may collect images of an eyeball, in addition to the camera.

The display unit 330 displays an image collected by the second image collection unit 391. In particular, the display unit 330 may display the iris recognition operating range on the image collected by the second image collection unit 391 to guide the movement of an eyeball of a user. According to an embodiment, it is possible to display an image collected by the first image collection unit 371. In a particular embodiment, it is possible to display both the image collected by the second image collection unit 391 and the image collected by the first image collection unit 371.

The control unit 310 controls the operations of the display unit 330, the first lighting unit 351, the second lighting unit 353, the first image collection unit 371, and the second image collection unit 391. Also, the control unit 310 measures a distance to an eyeball for iris recognition based on the images collected by the first image collection unit 371 and the second image collection unit 391. Related descriptions are provided in detail with reference FIGS. 7 to 8. Also, the control unit 310 performs iris recognition based on the image collected by the first image collection unit 371. In particular, the control unit 310 may extract an iris pattern from the image collected by the first image collection unit 371, as mentioned earlier. Also, the control unit 310 may compare the extracted iris pattern with an iris pattern stored in a storage unit (not shown) to identify a user. In a particular embodiment, the control unit 310 may represent whether an eyeball is located within an iris recognition operating range and the direction in which the eyeball moves to be located within the iris recognition operation range, with sound or a graphic user interface displayed on the display unit 330, as mentioned earlier. The particular operation of the iris recognition apparatus 300 according to an embodiment is described through FIG. 7.

FIG. 7 is a flowchart of an operation of an iris recognition apparatus according to another embodiment.

The second lighting unit 353 irradiates light to an eyeball of a user in step S301. In particular, if it is determined that the eyeball of the user for iris recognition is not included within an iris recognition operating range, the second lighting unit 353 may irradiate light to the eyeball of the user. In this case, the second lighting unit 353 irradiates visible light.

The first image collection unit 371 and the second image collection unit 391 collect images of a lit eyeball in step S303.

The control unit 310 corrects an image from the second image collection unit 371 based on angles of view of a lens of the first image collection unit 371 and a lens of the second image collection unit 391 in step S305. In particular, the control unit 310 may sample the image from the second image collection unit 391 based on the ratio between an angle of view of the lens of the first image collection unit 371 and an angle of view of the lens of the second image collection unit 391. For example, if the angle of view of the lens of the second image collection unit 391 is two times wider than the angle of view of the lens of the first image collection unit 371, the control unit 310 may sample the image from the first image collection unit 371 with ½. In particular, if the image from the first image collection unit 371 is captured to be 200 pixel/cm, the control unit 310 may sample the image from the first image collection unit 371 with 100 pixel/cm. In particular, the angle of view the lens of the second image collection unit 371 may be a multiple of the angle of view of the lens of the first image collection unit 371 in ratio. This is because it is difficult to perform correct sampling if the angle of view the lens of the second image collection unit 371 is not the multiple of the angle of view of the lens of the first image collection unit 371 in ratio. Through such correction, the control unit 310 may adjust the distance of the image from the first image collection unit 371 to be the same as the distance of the image from the second image collection unit 391. In another particular embodiment, the control unit 310 may scale the size of the image from the second image collection unit 391 based on the ratio between the angle of view of the lens of the first image collection unit 371 and the angle of view of the lens of the second image collection unit 391. For example, if the angle of view of the lens of the second image collection unit 391 is two times wider than the angle of view of the lens of the first image collection unit 371, the control unit 310 may consider that the image from the first image collection unit 371 is two times smaller than an original size. However, scaling the size of the image may have more errors in distance measurement than when sampling the image.

The control unit 310 determines based on the image collected by the first image collection unit 371 and the image collected by the second image collection unit 391 corrected whether an eyeball of a user for iris recognition is located within an iris recognition operating range, in step S307. In particular, the control unit 310 may measure a distance to the eyeball of the user for iris recognition based on the image collected by the first image collection unit 371 and the image collected by the second image collection unit 391 corrected, and determine based on the measured distance whether the eyeball is located within the iris recognition operating range. Related descriptions are provided with reference to FIG. 8.

FIG. 8 depicts the distance measurement of an iris recognition apparatus according to another embodiment.

The control unit 310 may measure the distance r between an iris recognition apparatus 300 and an eyeball based on the distance $d_f/n$ of an eyeball of an image collected by a first image collection unit 371 corrected and the distance dr2 of an eyeball of an image collected by a second image collection unit 391. This is because the distance $d_f/n$ of the eyeball of the image collected by the first image collection unit 371 corrected and the distance $d_{r2}$ of the eyeball of the image collected by the second image collection unit 391 varies according to the distance between the iris recognition apparatus 300 and the eyeball. Since the image is reduced through sampling as mentioned earlier, the distance $d_f/n$ of the eyeball of the image collected by the first image collection unit 371 corrected may be obtained by reducing the distance of the eyeball of the image collected by the first image collection unit 371. Alternatively, the distance $d_f/n$ of the eyeball of the image collected by the first image collection unit 371 corrected may be obtained by scaling the image to be a certain ratio. In this case, n is an angle of view of a lens of the second image collection unit 391/an angle of view of a lens of the first image collection unit 371. Since an angle of view is inverse proportional to a focal length, n is the focal length $f_1$ of the first image collection unit 371/the focal length $f_2$ of the second image collection unit 391.

For correct measurement, the control unit 310 may also measure the distance r between the iris recognition apparatus 300 and the eyeball based on the distance $d_f/n$ of the eyeball of the image collected by the first image collection unit 371 corrected, the distance $d_{r2}$ of the eyeball of the image collected by the second image collection unit 391, the focal length $f_2$ of the second image collection unit 391, and the base line distance b between the second image collection unit 171 and a third image collection unit 173. This is because the ratio between a sum of the distance $d_f/n$ of the eyeball of the image collected by the first image collection unit 371 corrected and the distance $d_r$ of the eyeball of the image collected by the second image collection unit 391 and the focal length $f_2$ of the lens is the same as the ratio between the base line distance b between the first image collection unit 371 and the second image collection unit 391 and the distance r between the iris recognition apparatus 300 and the eyeball. As a result, the control unit 310 may measure the distance between the iris recognition apparatus 300 and the eyeball by using the following expression in a particular embodiment:

$$r = f_2 \times b/(d_f/n + d_{r2}).$$

However, the expression above is rough and a correction process may be added later for precise distance measurement. Refer back to FIG. 7 for descriptions.

If an eyeball of a user for iris recognition is located within an iris recognition operating range, the control unit 310 turns off the second lighting unit 351 and turns on the first lighting unit 353 to irradiate light to the eyeball in step S309. In this case, the first lighting unit 353 irradiates an infrared ray to the eyeball. In particular the infrared ray may be an NIR. Since infrared lighting is sufficient for iris recognition, the first lighting unit 353 irradiating the infrared ray is turned on and the second lighting unit 351 irradiating the visible light is turned off. Accordingly, it is possible to selectively turn on the first lighting unit 351 or the second lighting unit 353 without a need to turning them all on based on whether the eyeball of the user for iris recognition is located within the iris recognition operating range. Thus, it is possible to reduce power consumption.

The control unit 310 performs iris recognition in step S311. In particular, the control unit 310 may extract an iris pattern from the image collected by the first image collection unit 371. In this case, the control unit 310 uses an image collected by the first image collection unit 371 that has not been corrected. Also, the control unit 310 may compare the extracted iris pattern with an iris pattern stored in a storage unit (not shown) to identify a user. In this case, when the extracted iris pattern matches the stored iris pattern to a certain degree, the control unit 310 may determine that a user having the extracted iris pattern is the same as a user having the stored iris pattern.

Also, if the eyeball of the user for iris recognition is not located within the iris recognition operating range in a particular embodiment, the control unit 310 may represent whether the eyeball is located within the iris recognition operating range and the direction in which the eyeball moves to be located within the iris recognition operation range, with sound or a graphic user interface displayed on the display unit 330, as in the embodiment in FIG. 4 mentioned earlier. In particular, the display unit 330 may display the iris recognition operating range on the image collected by the second image collection unit 391 to guide the movement of the eyeball of the user. In particular, the display unit 330 may display, on the image collected by the second image collection unit 391, both the iris recognition operating range and the direction in which the eyeball of the user moves, to guide the movement of the eyeball of the user.

The first image collection unit 371 has a narrow angle of view as mentioned earlier. Thus, the range of an image that the first image collection unit 371 may collect is relatively narrower than that of a camera used for picture capturing or the like Therefore, when iris is recognized, the eyeball needs to be located within a correct range. Thus, the iris recognition apparatus may cause inconvenience in that a user should correctly locate his or her eyeball to be within the iris recognition operating range that is narrow. Also, the first image collection unit 371 having a narrow angle of view needs a relatively longer optical path than the second image collection unit 391 having a wide angle of view. Thus, in order to secure the optical path of the first image collection unit 371, the thickness of the iris recognition apparatus 300 may increase. This may work as a considerable disadvantage of the iris recognition apparatus 500 when the trend toward a decrease in thickness of an electronic product such as a cellular phone or a notebook computer is considered. Thus, there are needs for the iris recognition apparatus 300 that may solve such a limitation and an operating method of the iris recognition apparatus 300. Related descriptions are provided in detail with reference FIGS. 9 to 12.

Through FIGS. 9 to 12, an iris recognition apparatus including a reflection unit and the operation of the iris recognition apparatus are described.

FIG. 9 shows a block diagram of an iris recognizing apparatus according to still another embodiment.

As shown in FIG. 9, an iris recognition apparatus 500 according to an embodiment includes a first lighting unit 551, a second lighting unit 553, a refection unit 581, a first image collection unit 571, a second image collection unit 591, a control unit 510, and a display unit 530.

The first lighting unit 551 irradiates an infrared ray to an eyeball including iris for iris recognition as mentioned earlier. In this case, the infrared ray may be an NIR between 700 nm and 900 nm in frequency. Also, the first lighting unit 551 may include a plurality of light sources in a particular embodiment. Also, the plurality of light sources of the first lighting unit 551 may be located at uniform intervals in a particular embodiment.

The second lighting unit 553 irradiates visible light to the eyeball as mentioned earlier.

The reflection unit 581 reflects an image of a lit eyeball. In a particular embodiment, the control unit 510 may change the image reflection direction of the reflection unit 581.

The first image collection unit 571 collects a reflected eyeball image. The image collected by the first image collection unit 571 is used for iris recognition.

The second image collection unit 591 collects an image including an eyeball of a user as an image having a relatively wider range than the first image collection unit 571, as mentioned earlier.

The display unit 530 displays an image collected by the second image collection unit 591 as mentioned earlier.

The control unit 510 controls the operations of the display unit 530, the first lighting unit 551, the second lighting unit 553, the first image collection unit 571, the reflection unit 581, and the second image collection unit 591. Also, the control unit 510 measures a distance to an eyeball for iris recognition based on the images collected by the first image collection unit 571 and the second image collection unit 591, as mentioned earlier. Also, the control unit 510 performs iris recognition based on the image collected by the first image collection unit 571 as mentioned earlier. In this case, the control unit 510 may sense a danger signal from the eyeball of the user. Related descriptions are provided in detail with reference FIGS. 11 to 12. Also, the control unit 510 may adjust the image reflection direction of the reflection unit 581, and thus adjust an iris recognition operating range. Related descriptions are provided through FIGS. 11a and 11b.

Through FIGS. 10a, 10b, 11a and 11b, a structure in which an iris recognition apparatus includes a reflection unit is described in detail.

FIGS. 10a, 10b, 11a and 11b show an iris recognizing apparatus including a reflection unit according to still another embodiment.

As could be seen in embodiments in FIGS. 10a, 10B, 11a and 11b, a reflection unit 581 reflects an image. A first image collection unit 571 and the reflection unit 581 are located on a plate-shaped frame. In this case, the reflection unit 581 reflects an image of an eyeball entering a surface of the frame. The first image collection unit 571 collects a reflected image. In particular, the first image collection unit 571 may face another surface, not the surface of the frame the image of the eyeball enters. Thus, the thickness of an iris recognition apparatus 500 may decrease than when the first image collection unit 571 faces the surface of the frame the image of the eyeball enters. As mentioned earlier, when it is considered that the optical path of the first image collection unit 571 is relatively long, the structure of the iris recognition apparatus significantly affects a decrease in thickness of the iris recognition apparatus 500. In a particular embodiment, the reflection unit 581 may be a reflector including a mirror.

Also, the first image collection unit 571 collects a reflected eyeball image from the direction in which the second image collection unit 591 is located, in an embodiment in FIGS. 10a and 10b. However, the reflection unit 581 reflects an image of an eyeball to the second image collection unit in an embodiment in FIGS. 11a and 11b. In the structure of the iris recognition apparatus 500 in the embodiment in FIGS. 11a and 11b, the reflection unit 581 is located further away from the second image collection unit 591 than in the structure of the iris recognition apparatus 500 in the embodiment in FIGS. 10a and 10b. Thus, a value corresponding to the base line distance b in the expressions in the embodiments in FIGS. 5 and 8 increases. Since the accuracy of distance measurement increases with an increase in value of the base line distance b, the iris recognition apparatus 500 in the embodiment in FIGS. 11a and 11b may more precisely measure the distance between the iris recognition apparatus 500 and an eyeball than the iris recognition apparatus 500 in the embodiment in FIGS. 10a and 10b.

Also, the first lighting unit 551 in the embodiments in FIGS. 10a, 10b, 11a and 11b includes a plurality of light sources as mentioned earlier. In this case, the plurality of light sources is located at intervals. In a particular embodiment, the control unit 510 may selectively turn on or off the plurality of light sources based on the reflection direction of the reflection unit 581. In particular, the control unit 510 may selectively turn on or off the plurality of light sources based on the image collection range of the first image collection unit 571 according to the reflection direction of the reflection unit 581. This is because the image collection range of the first image collection unit 571 varies according to the reflection direction of the reflection unit 581 and a range needing the lighting of the first lighting unit 551 also varies with a change in the image collection range of the first image collection unit 571.

Also, in the embodiments in FIGS. 10a, 10b, 11a and 11b, the control unit 510 may adjust the image reflection direction of the reflection unit 581 as mentioned earlier. For example, the control unit 510 may perform at least one of tilting and panning operations to change a reflection direction. Thus, a range of an image that the first image collection unit 571 may collect is expanded. Thus, the first image collection unit 571 may collect all of images of two eyeballs of a user even without an additional motion of the user. Accordingly, the control unit 510 may extract iris patterns from all of two eyeballs of the user. If the iris patterns are extracted from all of the two eyeballs of the user, there is an advantage in that it is possible to increase security than when an iris pattern is extracted from a single eyeball.

Through FIG. 12, how the iris recognition apparatus 500 collects an image of an eyeball to recognize iris is described.

FIG. 12 is a flowchart of operations of performing iris recognition according to still another embodiment.

The descriptions of the same operations as FIG. 4 or 7 are omitted. Also, an operation of collecting an image of an eyeball to recognize iris, which is different from FIG. 4 or 7 is described in detail.

A control unit 510 adjusts the reflection direction of a reflection unit 581 in step S501. In this case, the control unit 510 may adjust the reflection direction of the reflection unit 581 based on a user setting. Alternatively, the control unit 510 may adjust the reflection direction of the reflection unit 581 based on the current location of an eyeball. In a particular, the control unit 510 may adjust the reflection direction of the reflection unit 581 so that the eye may be included in an iris recognition operating range if the eyeball is out of the iris recognition operating range. In another particular embodiment, the control unit 510 may adjust the reflection direction of the reflection unit 581 to collect images of a recognized eyeball and another eyeball.

The reflection unit 581 reflects and transmits the image of the eyeball in step S503.

The first image collection unit 571 collects a reflected image in step S505.

The control unit 510 determines based on the collected image whether a dangerous situation is sensed, in step S507. This is to prevent another person from forcibly performing iris recognition on a user through confinement. In particular, the control unit 510 may sense a dangerous situation based on at least one of the operation of an eyeball, the location of the eyeball and an extracted iris pattern. In a particular embodiment, the control unit 510 may determine that a dangerous situation has arisen if there is a blinking operation. In this case, the control unit 510 may determine the dangerous situation based on at least one of the number of blinking times and a blinking speed. For example, the control unit 510 may determine that the dangerous situation has arisen if there are three consecutive blinking operations. In another particular embodiment, the control unit 510 may determine that a dangerous situation has arisen if the eyeball is located at a specific location. In this case, the location of the eyeball may be a relative location with respect to the iris recognition apparatus 500. For example, the control unit 510 may determine that a dangerous situation has arisen if the eyeball is located too far to one side. In another particular embodiment, the control unit 510 may determine that the dangerous situation has arisen, if an extracted iris pattern is an iris pattern set for a dangerous situation by a user. For example, the user may set an iris pattern for a right eyeball as an iris pattern for a normal situation, and an iris pattern for a left eyeball as an iris pattern for a dangerous situation. In this case, the control unit 510 may determine that the dangerous situation has arisen if the iris pattern for a right eyeball of a user is recognized. To this end, the control unit 510 should first extract an iris pattern before determining the dangerous situation, unlike the flowchart of FIG. 12.

If the dangerous situation is sensed, the control unit 510 performs an operation for coping with the dangerous situation in step S509. In a particular embodiment, the control unit 510 may transmit a danger message to an external server. In another particular embodiment, the control unit 510 may transmit a communication signal notifying a designated contact of a danger. For example, it is possible to transmit a rescue request message to a police station or the like. In another particular embodiment, the control unit 510 may delete data from an electronic product that includes the iris recognition apparatus 500. For example, if the dangerous situation is sensed, the control unit 510 may delete data from a hard disk of a computer that the iris recognition apparatus includes. In another particular embodiment, the control unit 510 may stop the operations of an electronic product that includes the iris recognition apparatus 500.

If the dangerous situation is not sensed, the control unit 510 extracts an iris pattern from a received image in step S511.

The control unit 510 identifies a user based on the extracted iris pattern in step S513. In particular, the control unit 510 may compare the extracted iris pattern with an iris pattern stored in a storage unit to identify the user.

An embodiment provides an iris recognition apparatus measuring a distance by using a plurality of image collection units, and an operating method thereof.

In particular, an embodiment provides an iris recognition apparatus measuring a distance by using a plurality of image collection units having different angles of view, and an operating method thereof.

Another embodiment provides an iris recognition apparatus including a reflection unit reflecting an image of an eyeball, and an operating method thereof. In particular, another embodiment provides an iris recognition apparatus expanding the image collection range of an image collection unit by including a reflection unit, and an operating method thereof.

Another embodiment also provides an iris recognition apparatus minimizing a thickness despite having a reflection, and an operating method thereof.

The characteristics, structures, and effects described in the embodiments above are included in at least one embodiment but are not limited to one embodiment. Furthermore, the characteristic, structure, and effect illustrated in each embodiment may be combined or modified for other embodiments by a person skilled in the art. Thus, it would be construed that contents related to such a combination and such a variation are included in the scope of embodiments.

Embodiments are mostly described above. However, they are only examples and do not limit the present disclosure. A person skilled in the art may appreciate that many variations and applications not presented above may be implemented without departing from the essential characteristic of embodiments. For example, each component particularly represented in embodiments may be varied. In addition, it should be construed that differences related to such a variation and such an application are included in the scope of the present disclosure defined in the following claims.

What is claimed is:

1. An iris recognition apparatus for recognizing an iris in an eyeball, the apparatus comprising:
a first image collection unit collecting a narrow angle of view image of the eyeball;
a second image collection unit comprising a lens having a larger angle of view than a lens of the first image collection unit and collecting a wide angle of view image of the eyeball; and
a control unit:
correcting the narrow angle of view image based on a ratio between the angle of view of the lens of the first image collection unit and the angle of view of the lens of the second image collection unit, measuring the distance between the eyeball and the iris recognition apparatus based on a first measure of a proportional distance of the eyeball of the narrow angle of view image corrected and a second measure of a proportional distance of the eyeball of the wide angle of view image, and performing iris recognition using the narrow angle of view image not corrected if the eyeball is located within an iris recognition operating range.

2. The iris recognition apparatus according to claim 1, wherein the control unit samples the narrow angle of view image based on the ratio between the angle of view of the lens of the first image collection unit and the angle of view of the lens of the second image collection unit.

3. The iris recognition apparatus according to claim 2, wherein the control unit samples the narrow angle of view image with a value obtained by dividing the angle of view of the lens of the first image collection unit by the angle of view of the lens of the second image collection unit.

4. The iris recognition apparatus according to claim 2, wherein the ratio between the angle of view of the lens of the first image collection unit and the angle of view of the lens of the second image collection unit is a multiple.

5. The iris recognition apparatus according to claim 1, further comprising:
a first lighting unit irradiating an infrared ray; and
a second lighting unit irradiating visible light,
wherein the control unit selectively turns on the first lighting unit or the second lighting unit based on an iris recognition operating range within which iris recognition is performed on the eyeball.

6. The iris recognition apparatus according to claim 5, wherein the control unit turns off the second lighting unit and turns on the first lighting unit, when the eyeball from outside the iris recognition operating range to within the iris recognition operating range.

7. An iris recognition apparatus for recognizing an iris in an eyeball, the iris recognition apparatus comprising:
a reflection unit reflecting and transmitting a narrow angle of view image of the eyeball;
a first image collection unit collecting the narrow angle of view image reflected;
a control unit extracting an iris pattern based on the narrow angle of view image collected; and
a second image collection unit collecting a wide angle of view image of the eyeball, and
wherein the control unit:
corrects the narrow angle of view image based on a ratio between the angle of view of the lens of the first image collection unit and the angle of view of the lens of the second image collection unit,
measures a distance to the eyeball based on a first measure of a proportional distance of the eyeball of the narrow angle of view image corrected and a second measure of a proportional distance of the eyeball of the wide angle of view image, and
performs iris recognition using the narrow angle of view image not corrected if the eyeball is located within an iris recognition operating range.

8. The iris recognition apparatus according to claim 7, further comprising a plate-shaped frame,
wherein the reflection unit is installed at the frame and reflects the narrow angle of view image entering a surface of the frame, and wherein the first image collection unit is installed in the frame and collects the narrow angle of view image reflected from the reflection unit.

9. The iris recognition apparatus according to claim 8, wherein the reflection unit reflects the narrow angle of view image to the second image collection unit.

10. The iris recognition apparatus according to claim 7, wherein the control unit adjusts the reflection direction of the reflection unit.

11. The iris recognition apparatus according to claim 7, wherein the control unit senses a dangerous situation based on at least one of the location of the eyeball, an iris pattern and the operation of the eyeball, and performs an operation for coping with the dangerous situation when the dangerous situation is sensed.

12. The iris recognition apparatus according to claim 11, wherein the control unit determines that a dangerous situation has arisen when the eyeball is located at a specific location with respect to the iris recognition apparatus.

13. An operating method of an iris recognition apparatus for recognizing iris in an eyeball, the operating method comprising:
collecting a narrow angle of view image of the eyeball through a first image collection unit;
collecting a wide angle of view image of the eyeball through a second image collection unit comprising a lens having a larger angle of view than a lens of the first image collection unit;
correcting the narrow angle of view image based on a ratio between the angle of view of the lens of the first image collection unit and the angle of view of the lens of the second image collection unit;
measuring the distance between the eyeball and the iris recognition apparatus based on a first measure of a proportional distance of the eyeball of the narrow angle of view image corrected and a second measure of a proportional distance of the eyeball of the wide angle of view image; and
performing iris recognition using the narrow angle of view image not corrected if the eyeball is located within an iris recognition operating range.

14. The operating method according to claim 13, wherein the correcting of the narrow angle of view image comprises sampling the narrow angle of view image based on the ratio between the angle of view of the lens of the first image collection unit and the angle of view of the lens of the second image collection unit.

15. The operating method according to claim 14, wherein the sampling of the narrow angle of view image comprises sampling the narrow angle of view image with a value obtained by dividing the angle of view of the lens of the first image collection unit by the angle of view of the lens of the second image collection unit.

16. The operating method according to claim 14, wherein the ratio between the angle of view of the lens of the first image collection unit and the angle of view of the lens of the second image collection unit is a multiple.

17. The operating method according to claim 13, further comprising selectively irradiating visible light and an infrared ray based on an iris recognition operating range within which iris recognition is performed on the eyeball.

18. The operating method according to claim 17, wherein the selective irradiating of the visible light and the infrared ray comprising irradiating the infrared ray after stopping the irradiation of the visible light when the eyeball moves from outside the iris recognition operating range to within the iris recognition operating range.

\* \* \* \* \*